US008554485B2

(12) United States Patent
Fink

(10) Patent No.: US 8,554,485 B2
(45) Date of Patent: Oct. 8, 2013

(54) METHOD AND SYSTEM OF PLOTTING VALUES INDICATIVE OF CHARACTERISTICS OF AN UNDERGROUND FORMATION

(75) Inventor: William L. Fink, Highlands Ranch, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 13/816,152

(22) PCT Filed: Sep. 1, 2010

(86) PCT No.: PCT/US2010/047530
§ 371 (c)(1),
(2), (4) Date: Feb. 8, 2013

(87) PCT Pub. No.: WO2012/030337
PCT Pub. Date: Mar. 8, 2012

(65) Prior Publication Data
US 2013/0138351 A1    May 30, 2013

(51) Int. Cl.
*G01V 1/34* (2006.01)
(52) U.S. Cl.
USPC .................................. 702/16; 702/11; 702/14
(58) Field of Classification Search
USPC ............ 702/9, 11, 14, 16; 324/312; 345/672
See application file for complete search history.

(56) References Cited

U.S. PATENT DOCUMENTS

| 3,946,356 | A | 3/1976 | Anstey |
| 4,821,164 | A | 4/1989 | Swanson |
| 7,319,637 | B2 | 1/2008 | Kerr |
| 2001/0028247 | A1* | 10/2001 | King et al. ..................... 324/312 |
| 2007/0143021 | A1* | 6/2007 | Griffiths et al. ................... 702/6 |
| 2009/0204332 | A1* | 8/2009 | Lomask et al. ................. 702/16 |
| 2011/0157235 | A1* | 6/2011 | FitzSimmons ................ 345/672 |

OTHER PUBLICATIONS

International Search Report issued Apr. 28, 2011 in International Application No. PCT/US2010/047530.

* cited by examiner

*Primary Examiner* — Sujoy Kundu
(74) *Attorney, Agent, or Firm* — Conley Rose, P.C.; Mark E. Scott; Bradley A. Misley

(57) ABSTRACT

Plotting values indicative of characteristics of an underground formation. At least some of the illustrative embodiments include: obtaining a plurality of values indicative of characteristics of an underground formation; and plotting the plurality of values on an output device of a computer system. The plotting may further include: plotting parallel to a first axis a first plurality of symbols where each symbol is indicative of a value of a characteristic of a first portion of the underground formation, location of the first plurality of symbols with respect to the first axis is indicative of a first parameter, and location of the first plurality of symbols with respect to a second axis is indicative of a second parameter distinct from the first parameter; and wherein location of at least one symbol with respect to the first axis is also indicative of a third parameter, different than the first and second parameters.

20 Claims, 5 Drawing Sheets

METHOD AND SYSTEM OF PLOTTING VALUES INDICATIVE OF CHARACTERISTICS OF AN UNDERGROUND FORMATION

CROSS-REFERENCE TO RELATED APPLICATIONS

None.

BACKGROUND

In the continuing advancements in identification and recovery of natural resources, such as oil and natural gas trapped in underground formations, many companies use computer models of the underground formation. Particular models look forward in time (i.e., the model predicts formation response to future actions such as hydrocarbon removal and/or secondary recovery techniques), and yet other models look backward in time (i.e., the models estimate past characteristics of the underground formation in geologic time, for example hundreds of thousands or millions of years in the past).

In order extract useful information from the models, in many cases the values of multiple characteristics need to be simultaneously analyzed visually. However, two-dimensional display devices of most computer systems do not lend themselves well to simultaneous display of more than two or three parameters at any one time. Even projecting a three-dimensional graph onto the two-dimensional display device has limitations.

Thus, any advance in the synthesis and visualization of data would provide a competitive advantage in the market place.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, software companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Characteristic" in relation to an underground formation shall include not only present-day characteristics, but also past characteristics (modeled or measured), and expected future characteristics.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to methods and systems to display or "visualize" multiple characteristics of an underground formation. The characteristics include not only present-day characteristics (e.g., present-day depth, present-day horizontal location, seismic-derived values), but also include derived, simulated or modeled characteristics. The modeled characteristics further include not only future expected characteristics of the underground formation, but also characteristics of the underground formation in the past on a geologic time scale (i.e., hundreds of thousands or millions of years). For ease of description, the bulk of the description is discussed in terms of modeled characteristics on a geologic time scale; however, the description being directed to modeled characteristics on a geologic time scale shall not be read as a limitation as to the applicability of the various embodiments.

Figure 1:
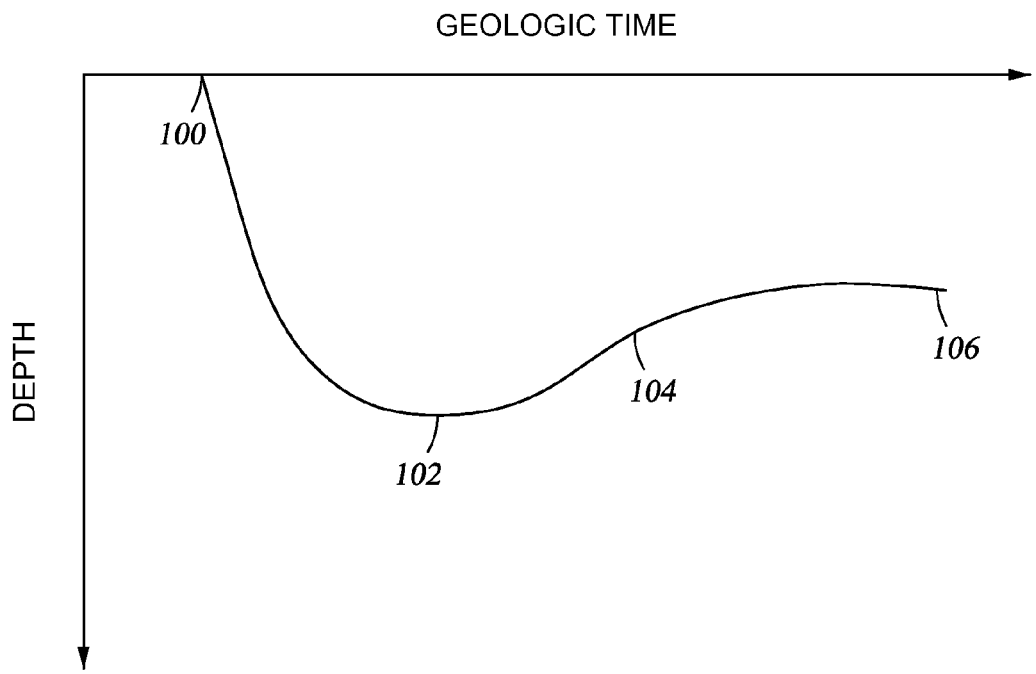
FIG. 1 shows a plot of the depth of a formation at a specific location as a function of geologic time.

Using at least some present-day data (e.g., seismic data, data regarding proximate fault lines, etc.), a computer model of a present-day underground formation may be constructed, where the model estimates various characteristics of the formation on a geologic time scale (the model sometimes referred to as a basin simulation model, or just basin model). For example, FIG. 1 shows a plot of an illustrative parameter being depth of the formation as a function of geologic time that could be extracted from a basin model. In particular, FIG. 1 shows that, for an illustrative portion of a formation, the portion of the formation initially started at the surface (point 100), and over time became increasingly deeper, with the portion of the formation eventually reaching a maximum depth (point 102). Thereafter, the portion of the formation was subjected to lifting forces, such that depth began to decrease (point 104), eventually becoming the present-day depth (point 106). It should be understood, however, that the plot of FIG. 1 is only for a relatively small portion of an underground formation. Another portion, though geologically connected present-day, may likewise start at the surface, but experience different depths as a function of geologic time.

Figure 2:
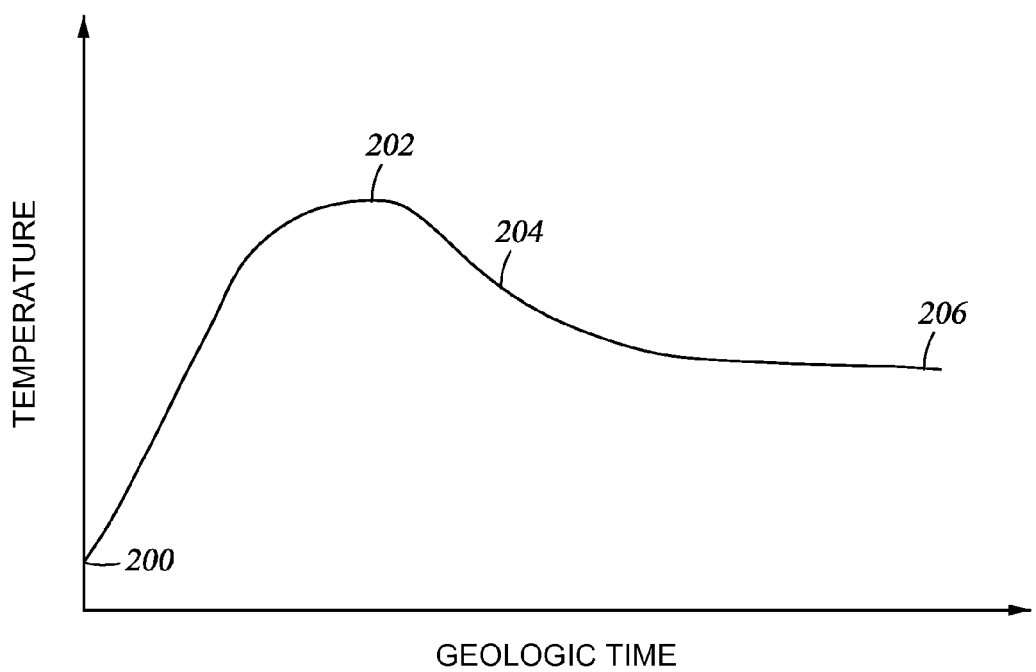
FIG. 2 shows a plot of the temperature of a formation at a specific location as a function of geologic time.

FIG. 2 shows a plot of another illustrative parameter being temperature of the underground formation as a function of geologic time. In particular, FIG. 2 shows that, for an illustrative portion of a formation, the portion of the formation initially started at a particular temperature (point 200, e.g., surface temperature millions of years ago), and over time became increasingly hotter (perhaps with increasing depth), with the portion of the underground formation eventually reaching a maximum temperature (point 202). Thereafter, the illustrative temperature of the portion of the formation began to decrease (point 204), eventually becoming the present-day temperature (point 206). Here again, it should be understood that the plot of FIG. 2 is only for a relatively small portion of an underground formation. Another portion, though geologically connected, may experience different temperatures as a function of geologic time.

Figure 3:
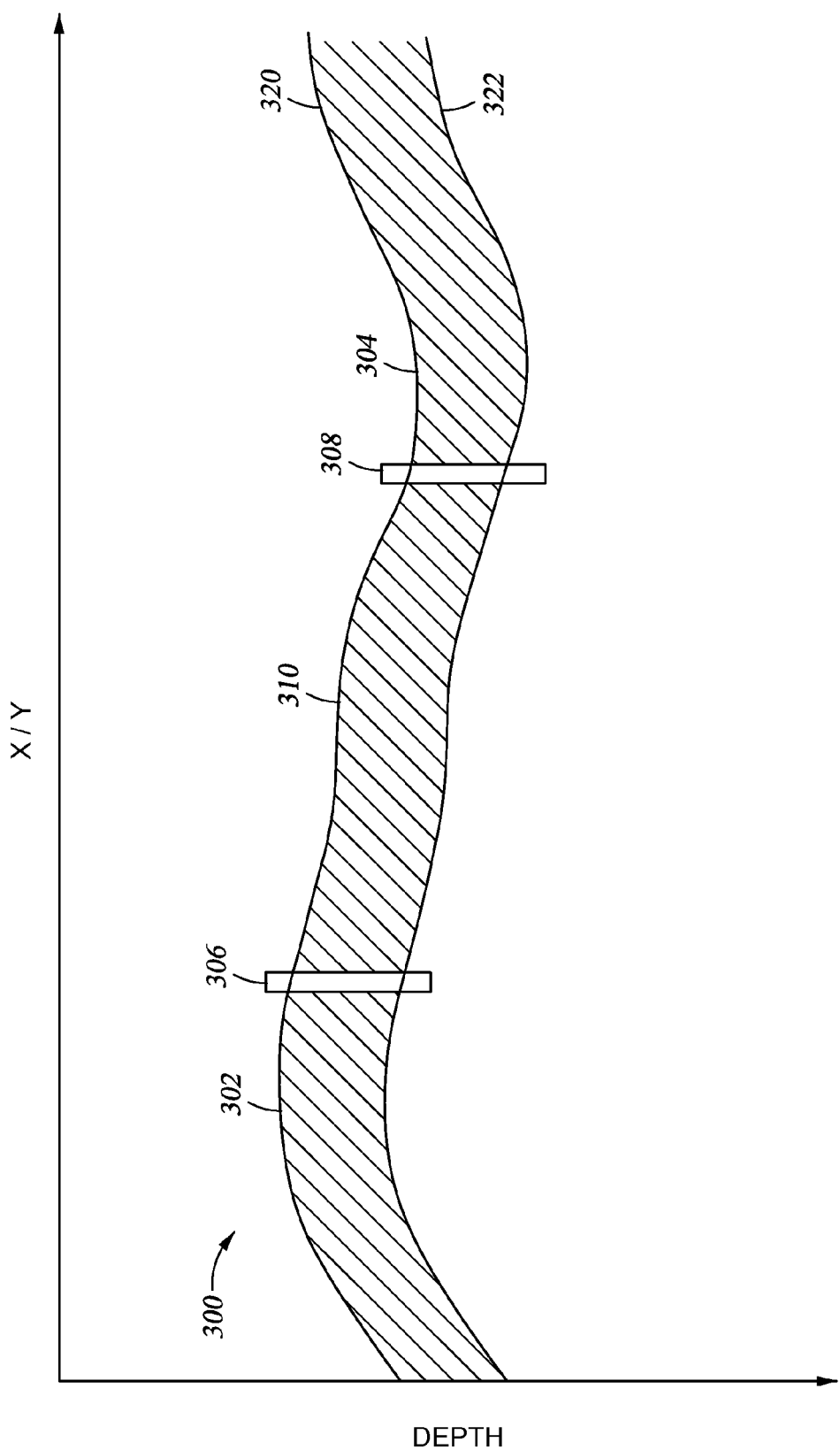
FIG. 3 shows a plot of a portion of an underground formation as a function present-day depth.

In order for a geologist to make an evaluation of a formation for hydrocarbon presence, quality, quantity and/or extraction location, the geologist may need to visually evaluate characteristics over geologic time of various portions the formation. For example, a geologist may want to compare the depth of the various portions of the formation 300 (FIG. 3) over geologic time, or may want to compare the temperature of the various portions of the formation 300 over geologic time. In order to highlight the difficulty in visualization of the related-art, consider FIG. 3 which shows a plot of present-day depth of an underground formation as a function of horizontal position. In particular, the abscissa of FIG. 3 is horizontal location (labeled as "X/Y"), and the ordinate is present-day depth. The horizontal location is labeled as "X/Y" to convey that the visualization is from a particular point relative to the surface of the earth, but does not convey a particular viewing direction. FIG. 3 illustrates that the formation 300 of interest has differing depths as a function of location. For example, portion 302 is more shallow than portion 304. Moreover, illustrative FIG. 3 may also convey additional information, such as the type of formation material by way of the cross-hatch or fill color between line 320 delineating the top surface or horizon of the formation and line 322 delineating the bottom surface or horizon of the formation.

In the related-art a comparison of a particular characteristic over geologic time across different portions of the formation 300 is difficult. For example, creating a query line or box 306 may trigger the computer system to display an additional two-dimensional plot (such as FIG. 1 or 2) that shows the geologic characteristic of interest for the particular location indicated by box 306. Likewise, creating a query line or box 308 may trigger an additional two-dimensional plot (such as FIG. 1 or 2) that shows the geologic characteristic of interest for the particular location indicated by box 308; however, synthesizing the data as between the two locations is difficult as the information is presented on two different charts. Moreover, the geologist may need to see the change in the geologic characteristic along the portions 310 of the formation between the portion 306 and portion 308, yet separate windows with graphs of the geologic characteristic for all the portions between portion 306 and portion 308 cannot be easily simultaneously displayed.

Figure 4:
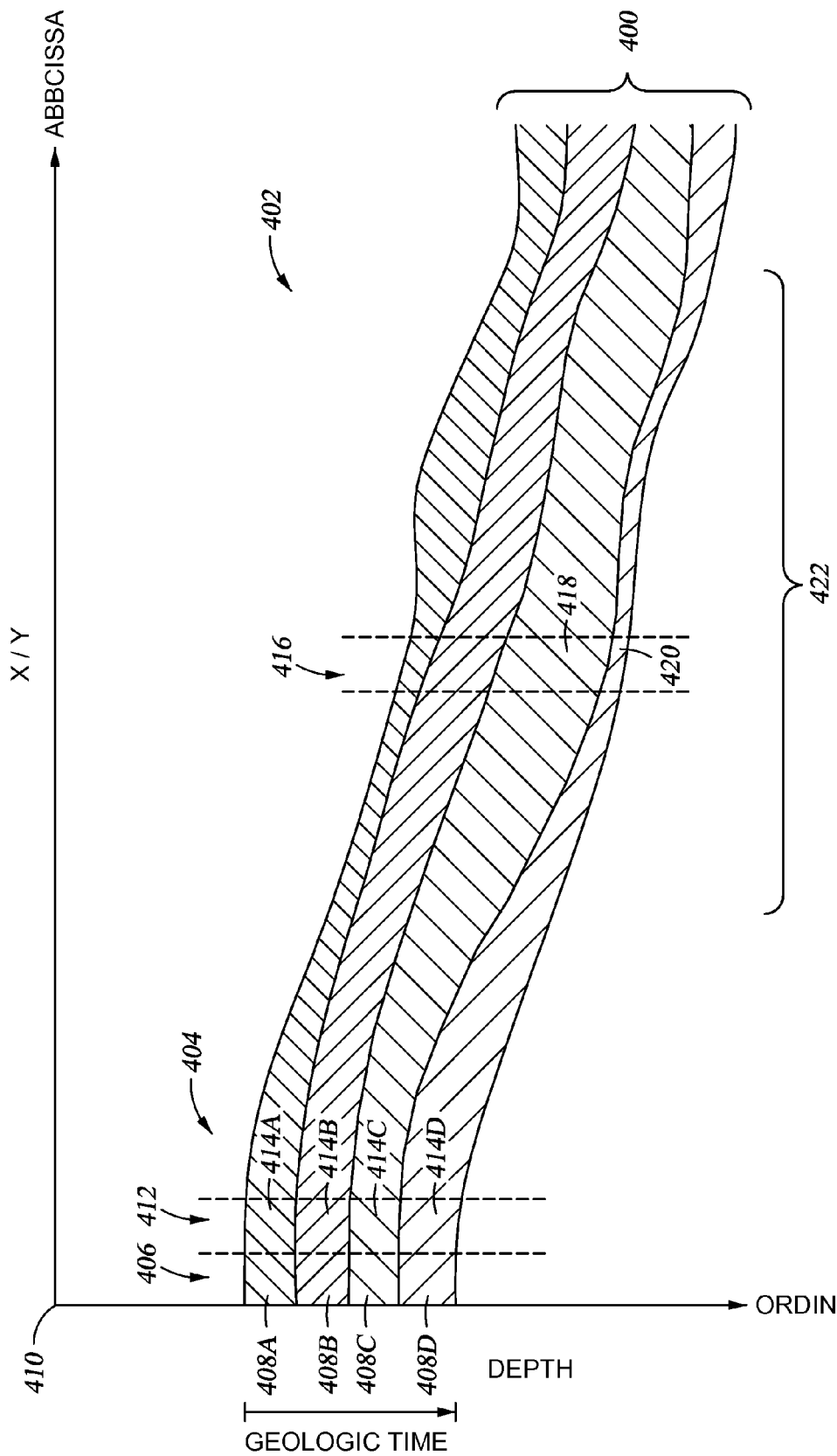
FIG. 4 shows a plot of a portion of an underground formation as a function of present-day depth, where one axis of the plot is overloaded to also show further characteristics, in accordance with at least some embodiments.

In accordance with particular embodiments, a graph of present-day depth of an underground formation (e.g., FIG. 3) is modified to overload at least one axis to simultaneously convey two parameters, and thus the graph itself conveys three parameters. Moreover, values of characteristics are plotted within the graph using symbols (such as color), so that a single "two-dimensional" plot simultaneously conveys four parameters of interest. FIG. 4 illustrates a plot in accordance with at least some embodiments where one axis is overloaded to show two parameters. In particular, FIG. 4 shows a plot of present-day depth of an underground formation 400 as a function of horizontal position in accordance with at least some embodiments. The abscissa of FIG. 4 is horizontal location (again labeled as "X/Y"), and the ordinate, in a first sense, is present-day depth. In FIG. 4 the illustrative formation 400 has differing depth as a function of location. For example, portions 404 of the formation are shallower than portions 402.

In the illustrative graph of FIG. 4, a plurality of symbols is plotted parallel to the ordinate, where each symbol in the plurality of symbols is indicative of a value of first characteristic of a first portion of the formation. In particular, for portion 406 of the formation 400, four illustrative symbols 408 (labeled 408A through 408D) are plotted. In the illustration of FIG. 4, each symbol is a quadrilateral with particular cross-hatching, but other symbols (such as sections of color) may be equivalently used. Moreover, the size of each symbol is exaggerated in FIG. 4 for clarity. In some embodiments each symbol may be relatively small (e.g., a single line width on a paper plot, single pixel of a display device, or a small group of pixels on a display device). In some cases, there may be enough symbols to give the appearance of smoothly varying the color, and in yet other cases the program that plots the symbols may fill the space between symbols such that the color appears to smoothly vary between the symbols.

The location of the plurality of symbols in accordance with the various embodiments conveys information to the viewer. In particular, in accordance with at least some embodiments, the position each symbol 408 with respect to the ordinate is indicative of a first parameter. For example, consider that the symbols 408 are indicative of temperature of the portion 406 of the formation 400 on a geologic time scale. Thus, symbol 408A is in this example is indicative of temperature of the portion 406 of the formation 400 at the creation of the formation, symbol 408D is indicative of temperature of the portion 406 of the formation 400 present-day, and symbols 408B and 408C are indicative of temperatures between creation and present-day. Thus, with respect to the vertical extent of symbols 408 considered as a group in this example, the ordinate represents geologic time.

In addition to the symbols 408 with respect to the ordinate representing a first parameter, one or more of the symbols 408 with respect to the ordinate also represent a second parameter. For example, taken as a group the symbols 408 with respect to the ordinate convey both a present-day depth of the portion 406 of the formation 400, as well as a thickness of the portion 406 of the formation 400. Thus, in this example the top of symbol 408A with respect to the ordinate represents present-day depth of the top of portion 406 of formation 400, and the bottom of symbol 408D with respect to the ordinate represents present-day depth of the bottom of portion 406 of formation 400, and thus the symbols 408 as a group in this example define the thickness of portion 406 of formation 400.

Thus, the ordinate in FIG. 4 is "overloaded". With the example parameters above, the ordinate not only is indicative of present-day depth (and indirectly thickness), but also within the vertical extent of the formation 400 is indicative of geologic time. It should be understood, however, that the "overloading" may take place without the ability to fully identify any particular parameter. For example, within the vertical extent of the formation the ordinate may be indicative of geologic time, but it is not necessary that geologic time is precisely identified; only that geologic time decreases downward in this example. Furthermore, the thickness of the overloaded parameter does not have to be confined within the formation. For example, to aid in interpretation, the overloaded parameter can be stretched deeper than the bottom of the formation for which it represents.

The symbols 408 for portion 406 again convey information for a relatively small portion of the formation 400. Additional sets of symbols for additional portions of a formation 400 may be plotted. For example, for portion 412 of the formation 400 a plurality of symbols 414 (labeled 414A through 414D) are plotted. The symbols 414 illustratively abut symbols 408, and also illustratively abut each other. Moreover, in order to simplify the discussion, for portions 406 and 412 the symbols 408 and 414, respectively, are equally sized; however, the symbols need not be of equal size. In fact, given that within formation 400 the symbols are plotted with respect to an overloaded ordinate, the size of the symbols may change depending on the value of the characteristic plotted. Consider, as an example, portion 416. In portion 416, one symbol dominates the portion. In the illustrative case of the symbols representing temperature of the portion of the formation over geologic time, for portion 416 the temperature represented by symbol 418 was present in the formation significantly longer than the temperature represented by portion 420.

In the example above, the symbols represent temperature of the formation over geologic time. By scanning across the formation 400, the eye can quickly and easily identify portions of the formation that have experienced particular temperatures for particular times. Consider, as a more specific example, that the cross-hatch being lines from lower-left to upper-right (e.g., used in symbol 408C) represent a "golden zone" of temperatures where hydrocarbon formation is most likely (e.g., the golden zone of 80 Degrees Celsius (C) to 120 C). The longer a portion of the formation remains within the "golden zone" the more likely it is that the portion of the formation contains hydrocarbons in commercial quantity and/or quality. Thus, the eye can quickly determine that for the example characteristic of temperature over geologic time, portions 422 of the formation 400 spent significant time at the "golden zone" of temperatures, and thus are prime candidates for placement of a wellbore. Moreover, the illustrative graph of FIG. 4 directly indicates the depth and horizontal location of the desirable locations.

Illustrative FIG. 4 was discussed in terms of the symbols being representative of a value of the characteristic being temperature over geologic time. However, any of a variety of characteristics could be plotted. For example, the symbols plotted could be derived from a basin model where the basin model provides values indicative of: temperature of the portion over to geologic time; net depth of the portion over geologic time; porosity of the portion over geologic time; permeability of the portion over geologic time; density of the portion with respect to geologic time; and lithology (i.e., elemental and/or mineralogical make up) of the portion with respect to geologic time. Further, the symbols plotted could be derived from a model that predicts future states of the formation, such as values indicative of: formation pressure with respect to time; net reserves with respect to time; or water saturation with respect to time. Moreover, the graphing technique need not be limited to values derived from models. For example, in other embodiments, the graphing technique may be used to display measured characteristics such as: amplitude of reflected seismic signals (from 4D seismic surveys) with respect to a seismic event (e.g., explosive charge detonation); phase of reflected prestack (i.e., signals before significant processing) seismic signals with respect to angle for a seismic event; or frequency of reflected prestack seismic signals with respect to offset (e.g., distance) for a seismic event.

The various embodiments have been discussed to this point in terms of the output produced on an output device of a computer system. The specification now turns to the illustrative hardware and software environments used to produce the output. In particular, at a high level production of the illustrative FIG. 4 can be considered to be a two-step process. A first computer system gathers and creates data upon which the illustrative plot is based, and saves the data to some form of portable storage device (e.g., magnetic disk drive, optical disk drive, flash device). Thereafter, a second computer system is provided the portable storage device, and in particular the data files on the portable storage device, and creates the second hardware and software environment, which creates the illustrative plot from the data. The gathering and creation is addressed first.

In accordance with at least some embodiments, a first hardware and software environment is invoked to gather data and save the data to a memory device, such as a portable storage device. In particular, a first hardware and software environment is invoked to gather information such as the locations of the formation top and bottom (i.e., the surfaces or horizons), and also to gather data that will be represented in the overloaded portion, in this example data with respect to geologic time from a basin model. The first hardware and software environment stores the conglomerated data to the portable storage device in any suitable standard, such as the Society of Exploration Geophysicists (SEG) "SEG Y" format, though other formats, and after-developed formats, may be equivalently used. Saving the conglomerated data in a suitable standard format may be referred to as saving the data to a 2D or 3D grid format, or simply saving the data to a standard stacked seismic data format. In the illustrative case of SEG Y, the seismic data format involves overloading the data with at least two parameters. A first parameter that contains the formation amplitude information correlated to location and/or depth, and a second parameter that contains the overloaded data (e.g., data in geologic time from the basin model), also correlated to location and/or depth.

In many cases, the portable storage device is created and then given to a client (e.g., working interest owner, mineral rights owner) for viewing and analysis. Thus, a second hardware and software environment is invoked to view and analyze the data. In accordance with the various embodiments, any of a variety of viewing and analysis programs may be used. For example, the SEISWORKS® brand products, available from Landmark Graphics Corporation of Houston, Tex., may be used to read the data from the portable storage device and produce the plot on a display device. Other products also available form Landmark Graphics Corporation that may read the data and display plots comprise the GEOPROBE® brand products, POWERVIEW® brand products, DECISIONSPACE® brand products.

While the hardware and software environment to this point has assumed a first computer systems to create the data in the seismic data format, and a second distinct computer system to read the data in the seismic data format and produce the plots, in some cases the same computer system both creates the data in the seismic data format and produces the plot.

Figure 5:
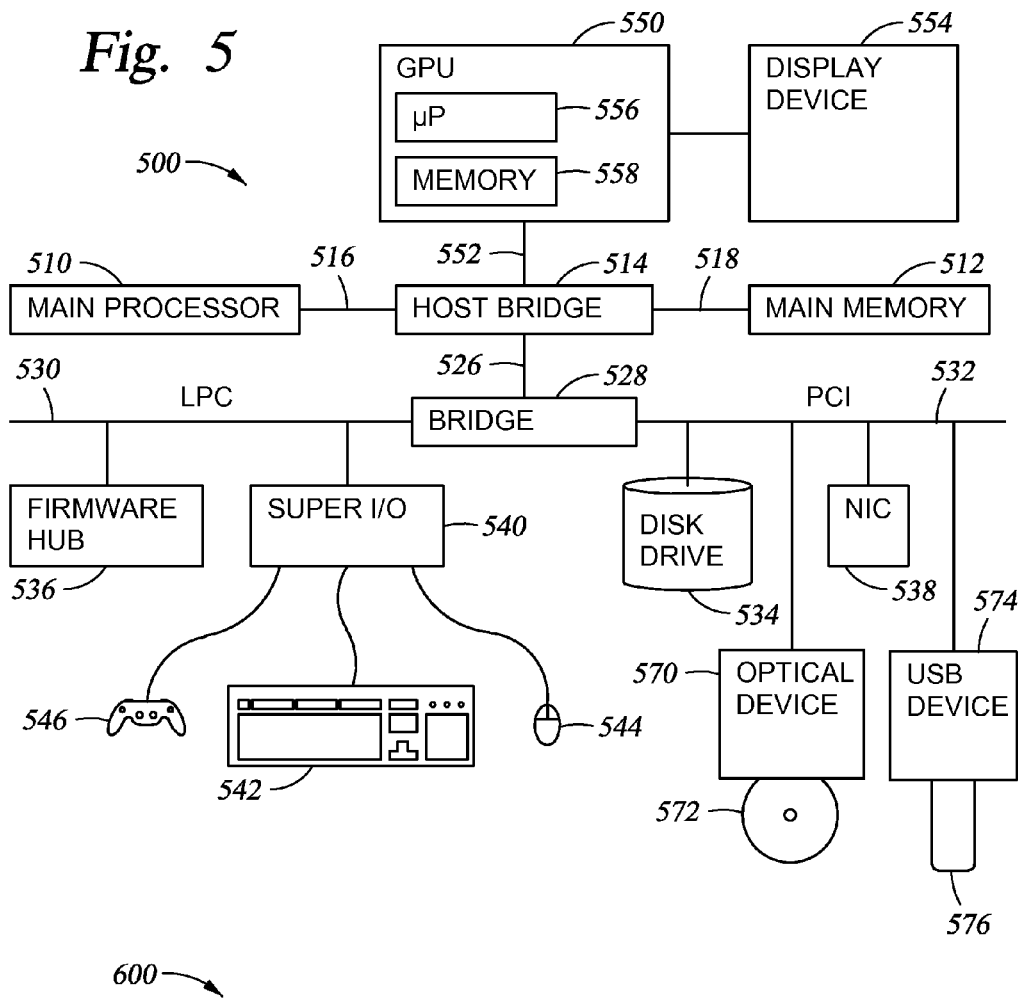
FIG. 5 shows a computer system in accordance with at least some embodiments.

The specification now turns to an illustrative computer system on which the various aspects may be implemented. In particular, FIG. 5 illustrates a computer system 500 in accordance with at least some embodiments. In particular, computer system 500 comprises a main processor 510 coupled to a main memory array 512, and various other peripheral computer system components, through integrated host bridge 514. Computer system 500 may implement multiple main processors 510. The main processor 510 couples to the host bridge 514 by way of a host bus 516, or the host bridge 514 may be integrated into the main processor 510. Thus, the computer system 500 may implement other bus configurations or bus-bridges in addition to, or in place of, those shown in FIG. 5.

The main memory 512 couples to the host bridge 514 through a memory bus 518. Thus, the host bridge 514 comprises a memory control unit that controls transactions to the main memory 512 by asserting control signals for memory accesses. In other embodiments, the main processor 510 directly implements a memory control unit, and the main memory 512 may couple directly to the main processor 510. The main memory 512 functions as the working memory for the main processor 510 and comprises a memory device or array of memory devices in which programs, instructions and data are stored. The main memory 512 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 512 is an example of a non-transitory computer-readable medium storing programs and instructions, and other examples are disk drives and flash memory devices.

The illustrative computer system 500 also comprises a second bridge 528 that bridges the primary expansion bus 526 to various secondary expansion buses, such as a low pin count (LPC) bus 530 and peripheral components interconnect (PCI) bus 532. Various other secondary expansion buses may be supported by the bridge device 528. However, computer system 500 is not limited to any particular chip set manufacturer, and thus bridge devices and expansion bus protocols from any of a variety of manufacturers may be equivalently used.

Firmware hub 536 couples to the bridge device 528 by way of the LPC bus 532. The firmware hub 536 comprises read-only memory (ROM) which contains software programs executable by the main processor 510. The software programs comprise programs executed during and just after power on self tests (POST) procedures as well as memory reference code. The POST procedures and memory reference code perform various functions within the computer system before control of the computer system is turned over to the operating system.

The computer system 500 further comprises a network interface card (NIC) 538 illustratively coupled to the PCI bus 532. The NIC 538 acts as to couple the computer system 500 to a communication network, such as the Internet.

Still referring to FIG. 5, computer system 500 may further comprise a super input/output (I/O) controller 540 coupled to the bridge 528 by way of the LPC bus 530. The Super I/O controller 540 controls many computer system functions, for example interfacing with various input and output devices such as a disk drive 534, keyboard 542, a pointing device 544 (e.g., mouse), game controller 546, and various serial ports. The super I/O controller 540 is often referred to as "super" because of the many I/O functions it performs.

FIG. 5 also shows a plurality of illustrative portable storage devices. For example an optical reading and writing device 570 may couple to any suitable bus of the computer system, such as the PCI bus 532. The optical reading and writing device 570 may thus read data from, and write data to, an illustrative optical disc 572 (e.g., CDROM, DVD). Further still, computer system 500 may have Universal Serial Bus (USB) adapter 574 coupled to any suitable bus, such as the PCI bus 532. In other cases, a USB bus may be directly supported by other devices in the computer system, such as the bridge device 528 or the super I/O controller 540. Regardless of the how USB bus is supported, the computer system 500 may thus read and write to an illustrative flash drive 576. It will be understood that the illustrative portable storage devices in the form of an optical disc 572 and flash device 576 are merely illustrative. Any currently available or after-developed storage technology with sufficient storage capacity and data longevity to store data in the seismic data format, may be equivalently used.

The computer system 500 further comprises a graphics processing unit (GPU) 550 coupled to the host bridge 514 by way of bus 552, such as a PCI Express (PCI-E) bus or Advanced Graphics Processing (AGP) bus. Other bus systems, including after-developed bus systems, may be equivalently used. Moreover, the graphics processing unit 550 may alternatively couple to the primary expansion bus 526, or one of the secondary expansion buses (e.g., PCI bus 532).

The graphics processing unit 550 couples to a display device 554 which may comprise any suitable electronic display device upon which any image or text can be displayed. The graphics processing unit 550 comprises one or more onboard processors 556, as well as onboard memory 558. The processor 556 performs graphics processing, as commanded by the main processor 510. Moreover, the memory 558 may be significant, on the order of several hundred megabytes or more. Thus, once commanded by the main processor 510, the graphics processing unit 550 may perform significant calculations regarding graphics to be displayed on the display device, and ultimately display such graphics, without further input or assistance of the main processor 510.

Thus, the computer system of FIG. 5 is illustrative of the hardware environment that may collect data and store the data in the seismic stacked data format. The system of FIG. 5 is also illustrative of the hardware environment that may read data in the seismic stacked data format and produce the plot on a display device.

Figure 6:
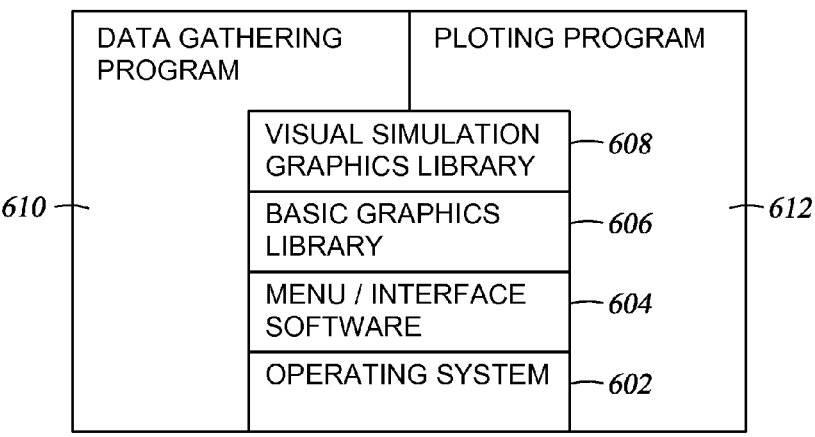
FIG. 6 shows a software environment in accordance with at least some embodiments.

FIG. 6 shows an illustrative software environment 600 within which the various embodiments may operate, and which software environment 600 may operate on the illustrative hardware environment FIG. 5. At the base of the software environment 600 is an operating system 602, such as a Windows™ operating system from Microsoft Corporation. Menu and interface software 604 overlays operating system 602. Menu and interface software 604 are used to provide various menus and windows to facilitate interaction with the user, and to obtain user input and instructions. Menu and interface software 604 may comprise, for example, Windows™, X Free 86™, and/or MOTIF™.

Basic graphics library 606 overlays menu and interface software 604. Basic graphics library 606 is an application programming interface (API) for computer graphics. The functions performed by basic graphics library 606 may comprise, for example, geometric and raster primitives, viewing and modeling transformations, lighting and shading, hidden surface removal, alpha blending (translucency), anti-aliasing, and texture mapping. A particularly useful basic graphics library 606 is OpenGL™, marketed by Khronos Group of Beaverton, Oreg., and particular OpenGL™ 2.0 and above. The OpenGL™ API is a multi-platform industry standard that is hardware, window, and operating system independent. OpenGL™ is designed to be callable from multiple programming languages, such as C, C++, FORTRAN, Ada and Java.

Visual simulation graphics library 608 overlays the basic graphics library 606. Visual simulation graphics library 608 is an API for creating real-time, multi-processed 3-D visual simulation graphics applications. Visual simulation graphics library 608 provides functions that bundle together graphics library state control functions such as lighting, materials, texture, and transparency. These functions track state and the creation of display lists that can be rendered later. A particularly useful visual simulation graphics library 608 is Open Scene Graph™, which is also available from Khronos Group. OpenSceneGraph™ supports the OpenGL™ graphics library discussed above. Open Scene Graph™ operates in the same manner as OpenGL Performer™, providing programming tools written in C/C++ for a large variety of computer platforms.

A data gathering program 610 of the various embodiments overlays the various libraries. The data gathering program 610 may gather data, such as formation horizon information, as well as the data to be overloaded (e.g., data from a basin model with respect to geologic time or data from prestack seismic with respect to offset or angle). Program 610 then saves the data on a memory device in a gridded or seismic data format. Program 610 interfaces with, and may utilize the functions carried out by, the visual simulation graphics library 608, basic graphics library 606, menu and interface software 604, and operating system 602. In some embodiments program 610 is written in an object oriented programming language (e.g., C++) to enable the creation and use of objects and object functionality. Likewise, a plotting program 612, such as a SEISWORKS® brand program, overlays visual simulation graphics library 608. The plotting program 610 may read data stored in a seismic standard data format, and produce an overloaded plot such as in FIG. 4. Plotting program 612 interfaces with, and may utilize the functions carried out by, the visual simulation graphics library 608, basic graphics library 606, menu and interface software 604, and operating system 602. In some embodiments program 612 is written in an object oriented programming language (e.g., C++) to enable the creation and use of objects and object functionality.

Some or all of the software environment 600 may be stored on a long term, non-volatile storage device within computer system 500, such as disk drive 534, and loaded to the main memory 512 during booting and/or initial operation of the computer system 500. In other embodiments, some or all of the software environment may be loaded into the main memory 512 by way of the NIC 538.

Figure 7:
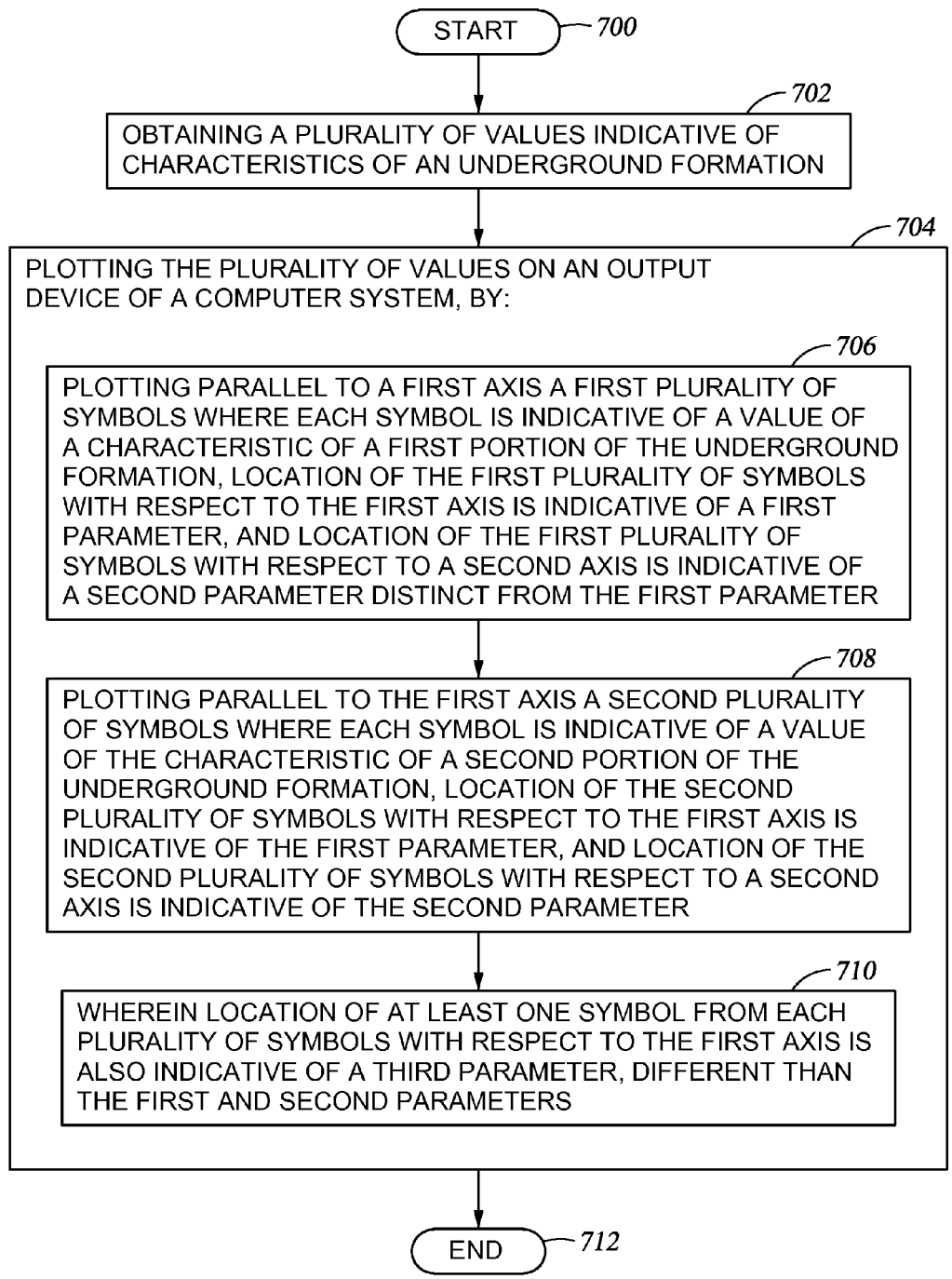
FIG. 7 shows a method in accordance with at least some embodiments.

FIG. 7 shows a method (e.g., software) in accordance with at least some embodiments. In particular, the method starts (block 700) and proceeds to: obtaining a plurality of values indicative of characteristics of an underground formation (block 702); plotting the plurality of values on an output device of a computer system (block 704). The plotting may further comprise: plotting parallel to a first axis a first plurality of symbols where each symbol is indicative of a value of a characteristic of a first portion of the underground formation, location of the first plurality of symbols with respect to the first axis is indicative of a first parameter, and location of the first plurality of symbols with respect to a second axis is indicative of a second parameter distinct from the first parameter (block 706); and plotting parallel to the first axis a second plurality of symbols where each symbol is indicative of a value of the characteristic of a second portion of the underground formation, location of the second plurality of symbols with respect to the first axis is indicative of the first parameter, and location of the second plurality of symbols with respect to a second axis is indicative of the second parameter (block 708); and wherein location of at least one symbol from each plurality of symbols with respect to the first axis is also indicative of a third parameter, different than the first and second parameters (block 710). Thereafter, the illustrative method ends (block 712).

From the description provided herein, those skilled in the art are readily able to combine software created as described with appropriate general-purpose or special-purpose computer hardware (e.g., graphics processing unit) to create a computer system and/or computer subcomponents in accordance with the various embodiments, to create a computer system and/or computer subcomponents for carrying out the methods of the various embodiments, and/or to create a non-transitory computer-readable storage media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, while the plotting value has been discussed with respect to a display device of a computer system, any output device (e.g., a display device, a plotter, and printer) may be equivalently used as the output device on which the plotting takes place. Moreover, overloading the vertical axis is merely illustrative, and any axis could be equivalently overloaded. It is intended that the following claims be interpreted to embrace all such variations and modifications.

What is claimed is:

1. A method comprising:
obtaining, by a computer system, a plurality of values indicative of characteristics of an underground formation;
plotting, by the computer system, the plurality of values on an output device of the computer system, the plotting by:
plotting parallel to a first axis a first plurality of symbols where each symbol is indicative of a value of a characteristic of a first portion of the underground formation, location of the first plurality of symbols with respect to the first axis is indicative of a first parameter, and location of the first plurality of symbols with respect to a second axis is indicative of a second parameter distinct from the first parameter; and
plotting parallel to the first axis a second plurality of symbols where each symbol is indicative of a value of the characteristic of a second portion of the underground formation, location of the second plurality of symbols with respect to the first axis is indicative of the first parameter, and location of the second plurality of symbols with respect to the second axis is indicative of the second parameter; and
wherein location of at least one symbol from each plurality of symbols with respect to the first axis is also indicative of a third parameter, different than the first and second parameters.

2. The method of claim 1 wherein the first parameter is geologic time, the second parameter is present-day horizontal location, and the third parameter is present-day depth of the respective portion of the underground formation.

3. The method of claim 2 wherein the characteristic is at least one selected from the group consisting of: temperature with respect to geologic time; depth with respect to geologic time; porosity with respect to geologic time; permeability with respect to geologic time; density with respect to geologic time; and lithology with respect to geologic time.

4. The method of claim 1 wherein the second parameter is present-day horizontal location, and the third parameter is present-day depth, and the characteristic and first parameter are at least one selected from the group consisting of: amplitude of reflected seismic signals (from 4D seismic surveys) with respect to a seismic event; phase of reflected seismic signals with respect to angle for a seismic event; or frequency of reflected seismic signals with respect to offset for a seismic event.

5. The method of claim 1 wherein plotting the first plurality of symbols further comprises plotting sections of color.

6. The method of claim 5 wherein plotting sections of color further comprises plotting sections of color such that a range of values of the characteristic are plotted in a same color.

7. The method of claim 1 wherein the output device is a display device.

8. The method of claim 1 wherein the first axis is a vertical axis.

9. The method of claim 1 wherein obtaining the plurality of values further comprises obtaining modeled values indicative of one or more characteristics of an underground formation, the modeled values generated by a basin simulation model.

10. A system comprising:
a processor;
a memory coupled to the processor; and
a display device coupled to the processor;
the memory stores a program that, when executed by the processor, causes the processor to:
obtain a first data set indicative of a horizon of an underground formation;
obtain a second data set indicative of a characteristic of the underground formation;
write values indicative of the horizon of the underground formation, and values indicative of the characteristic of the underground formation, the writing to a portable storage device coupled to the processor, the writing in conformance with a seismic data format and such that, when the values are read and plotted, an arrangement of the values cause a plotting program to:
plot parallel to a first axis a first plurality of symbols where each symbol is indicative of the characteristic of a first portion of the underground formation, location of the first plurality of symbols with respect to the first axis is indicative of a first parameter, and location of the first plurality of symbols with respect to a second axis is indicative of a second parameter distinct from the first parameter; and
plot parallel to the first axis a second plurality of symbols where each symbol is indicative of the characteristic of a second portion of the underground formation, location of the second plurality of symbols with respect to the first axis is indicative of the first parameter, and location of the second plurality of symbols with respect to a second axis is indicative of the second parameter; and
wherein location of at least one symbol from each plurality of symbols with respect to the first axis is also indicative of a third parameter, different than the first and second parameters.

11. The system of claim 10 wherein the first parameter is geologic time, the second parameter is present-day horizontal location, and the third parameter is present-day depth.

12. The system of claim 11 wherein the characteristic is at least one selected from the group consisting of: temperature with respect to geologic time; depth with respect to geologic time; porosity with respect to geologic time; permeability with respect to geologic time; density with respect to geologic time; and lithology with respect to geologic time.

13. The system of claim 10 wherein the second parameter is present-day horizontal location, and the third parameter is present-day depth of the respective portion of the underground formation, and the characteristic and first parameter are at least one selected from the group consisting of: amplitude of reflected seismic signals with respect to a seismic event; phase of reflected seismic signals with respect to angle for a seismic event; or frequency of reflected seismic signals with respect to offset for a seismic event.

14. The system of claim 10 wherein the first axis is a vertical axis.

15. A method comprising:
obtaining, by a computer system, a first data set indicative of a horizon of an underground formation;
obtaining, by the computer system, a second data set indicative of a characteristic of the underground formation; and
writing, by the computer system, values indicative of the horizon of the underground formation, and values indicative of the characteristic of the underground formation, the writing to a memory device, and the writing such that when the values are read and plotted by a plotting program, the values cause the plotting program to:
plot parallel to a first axis a first plurality of symbols where each symbol is indicative of the characteristic of a first portion of the underground formation, location of the first plurality of symbols with respect to the first axis is indicative of a first parameter, and location of the first plurality of symbols with respect to a second axis is indicative of a second parameter distinct from the first parameter; and
plot parallel to the first axis a second plurality of symbols where each symbol is indicative of the characteristic of a second portion of the underground formation, location of the second plurality of symbols with respect to the first axis is indicative of the first parameter, and location of the second plurality of symbols with respect to a second axis is indicative of the second parameter; and
wherein location of at least one symbol from each plurality of symbols with respect to the first axis is also indicative of a third parameter, different than the first and second parameters.

16. The method of claim 15 wherein the first parameter is geologic time, the second parameter is present-day horizontal location, and the third parameter is present-day depth of the respective portion of the underground formation.

17. The method of claim 16 wherein the characteristic is at least one selected from the group consisting of: temperature with respect to geologic time; depth with respect to geologic time; porosity with respect to geologic time; permeability with respect to geologic time; density with respect to geologic time; and lithology with respect to geologic time.

18. The method of claim 15 wherein the second parameter is present-day horizontal location, and the third parameter is present-day depth of the respective portion of the underground formation, and the characteristic and first parameter are at least one selected from the group consisting of: amplitude of reflected seismic signals with respect to a seismic event; phase of reflected seismic signals with respect to angle for a seismic event; or frequency of reflected seismic signals with respect to offset for a seismic event.

19. The method of claim 15 wherein the first axis is a vertical axis.

20. The method of claim 15 wherein obtaining the second set indicative of a characteristic of the underground formation further comprises obtaining from a model data indicative of the characteristic with respect to geologic time.

* * * * *